United States Patent [19]

Mattson et al.

[11] 3,818,311

[45] June 18, 1974

[54] PROTECTIVE CIRCUIT FOR SEMI-CONDUCTOR SWITCH

[75] Inventors: Gary L. Mattson, Pine Island; Lawrence P. Segar, Rochester, both of Minn.

[73] Assignee: International Business Machines Corporation, Armonk, N.Y.

[22] Filed: Nov. 3, 1972

[21] Appl. No.: 303,663

[52] U.S. Cl. .............. 321/43, 317/33 R, 317/DIG. 6

[51] Int. Cl. .............................................. H02m 7/44

[58] Field of Search........ 317/DIG. 6, 33 R; 321/45, 321/44, 2; 323/DIG. 1; 307/240

[56] References Cited

UNITED STATES PATENTS

| | | | |
|---|---|---|---|
| 3,313,998 | 4/1967 | Bunker | 321/44 |
| 3,628,047 | 12/1971 | Cronin | 323/DIG. 1 UX |

*Primary Examiner*—J. D. Miller
*Assistant Examiner*—Patrick R. Salce
*Attorney, Agent, or Firm*—Carl W. Laumann, Jr.

[57] ABSTRACT

A clamp circuit for the protection of a semiconductor switch. The circuit has particular value in a stored energy inverter. The energy which is not delivered to the secondary winding would normally result in an induced voltage of reversed polarity upon opening the switch connecting the primary winding to the source of electrical energy. This induced voltage adds to the supply voltage to create a high voltage across the switch. Semiconductor switches having limited dissipation ability are protected by connecting an inductance-capacitance resonant circuit across the switch. When the switch is open, the capacitor charges to a voltage of a first polarity. When the switch is closed, a half-cycle of oscillation occurs to reverse the polarity of the capacitor voltage. This stored charge serves to absorb the induced voltage which results from opening the switch, thereby limiting dissipation within the switch during this period.

8 Claims, 11 Drawing Figures

PROTECTIVE CIRCUIT FOR SEMI-CONDUCTOR SWITCH

BACKGROUND OF THE INVENTION

The use of semiconductor devices as switches in static inverters requires attention to the problems of handling the reactive power which arises in such systems. The problem is particularly significant in a stored energy system in which the secondary winding conducts current only during the flux decay period. In such systems, the leakage inductance gives rise to an induced voltage in the primary winding which can be many times the input supply voltage.

Since this voltage is polarized to add to the supply voltage, the semiconductor switch is exposed to a voltage of polarity and magnitude which can easily destroy it. This problem is aggravated by the fact that many switches are relatively slow to turn off and the high dissipation during the period in which collector current drops to zero becomes the limiting factor. Various clamp circuits have been devised to prevent the semiconductor switch from experiencing a high transient voltage. Some such circuits simply provide for dissipation of the energy in an element which can safely handle the power involved. Certain other circuits provide for absorption and storage of the transient energy so that it can be later returned to the circuit. While these circuits are generally effective in limiting the absolute value of voltage which can be applied to the semiconductor switch, this protection does not decrease the power dissipation in the semiconductor switch.

What is needed is a clamp circuit which limits the voltage applied during transition from on to off so that the dissipation limits are not exceeded during this period.

SUMMARY OF THE INVENTION

The preferred embodiment of the invention is effective to limit the voltage change at the collector of the semiconductor switch during the transition from the on state to the off condition. This is accomplished by providing a sink for the inductor current resulting from interruption of the current flow in the semiconductor switch. The current sink is a capacitor having a voltage charge equal to the inductor voltage at the time the switch is opened. The capacitor is charged to the opposite polarity during the period when current flows through the load. When the switch is closed, the capacitor is connected to an inductor to form a series resonant circuits. A half cycle of oscillation occurs which reverses the polarity of the voltage across the capacitor and creates a sink for the current induced at the next interruption.

The current flow into the capacitor slows the rise of voltage across the semiconductor switch. The capacitor size is selected to provide a capacity sufficient to limit the maximum voltage to which it is charged and therefore, also the voltage across the switch.

FIGS. *3a–3f* illustrate the current flow and voltage polarity at various points in the circuit during one cycle of operation.

Figure 4:
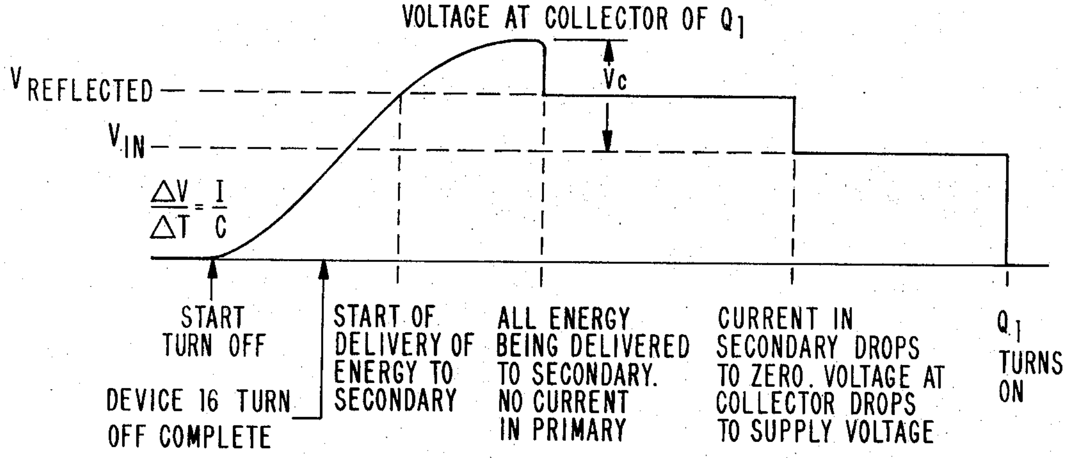

FIG. 4 is a graphical representation of the voltage at the terminals of the semiconductor switch during one cycle of operation.

Figures 1, 2:
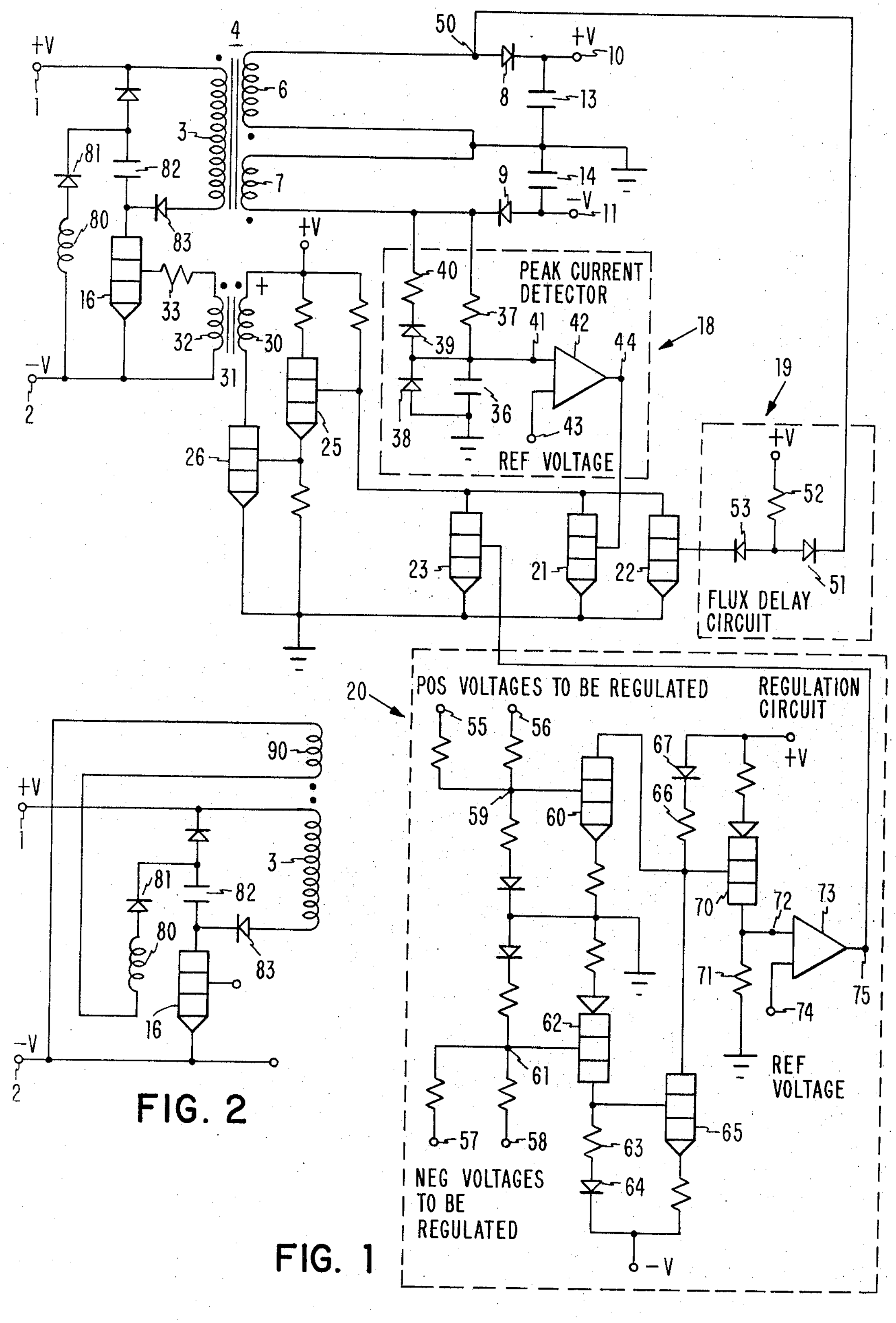
FIG. 1 is a schematic drawing of a static inverter power supply which uses the invention.
FIG. 2 is a schematic drawing showing an alternative form of one part of the circuit shown in FIG. 1.
Figure 5:
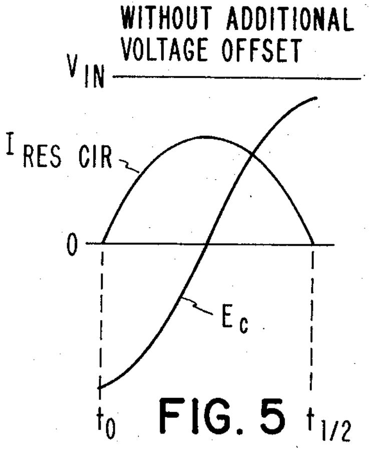
Figure 6:
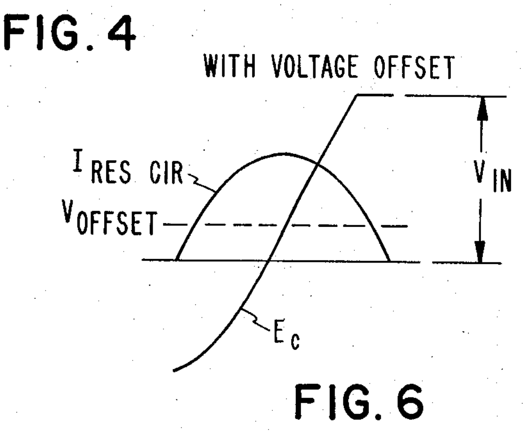

FIGS. 5 and 6 illustrate the effect of a voltage offset bias on the waveforms present in the resonant circuit included in FIG. 1.

DETAILED DESCRIPTION

The circuit shown in FIG. 1 is illustrative of a static inverter power supply incorporating the invention. A source of d.c. energy is connected to input terminals 1 and 2 which are connected to a primary winding 3 of transformer 4. A pair of secondary windings 6 and 7 are connected to rectifiers 8 and 9 to provide a pair of output voltages at the power supply output terminals 10 and 11. A pair of filter capacitors 13 and 14 are connected from terminals 10 and 11, respectively, to ground.

It will be observed that the polarity of windings 3, 6 and 7 together with the polarity of rectifiers 8 and 9 prevents conduction through rectifiers 8 and 9 except when the flux in the magnetic core of transformer 4 is decreasing. When the current is flowing from terminal 1, through winding 3 and semiconductor switch 16 to terminal 2, the potential across winding 3 is such that the end indicated with the dot is at a positive potential with respect to the other end. The same convention applies to the secondary windings 6 and 7. Thus, the positive end of winding 6 is grounded and diode 8 is back biased to block conduction. Similarly, diode 9 is also back biased because the negative end of winding 7 is grounded. Since both diodes 8 and 9 are back biased when current flows from terminal 1 to terminal 2, no current can flow in secondary windings 6 and 7 during this period.

Since no current can flow in the secondary windings during the period while current from the source of electrical energy is flowing in primary winding 3, the energy supplied by this current is stored in the core of transformer 4 in the form of magnetic flux. When semiconductor switch 16 opens and the flux in the magnetic core starts to decrease, the polarity of the induced voltage across windings 3, 6 and 7 is reversed. This causes rectifiers 8 and 9 to be forward biased and current flows in windings 6 and 7.

Semiconductor switch 16, shown as a transistor, is operated according to three control functions represented by peak current detector 18, flux decay circuit 19 and regulation circuit 20. The outputs from these circuits are connected to transistor 21, 22 and 23 respectively. The connection of transistors 21, 22 and 23 is such that when any one of them is conducting, the base of transistor 25 is biased to hold transistor 25 in the non-conducting state. This cuts off base current to switch drive transistor 26 and no current can flow through primary winding 30 of transformer 31. When no current is flowing in primary winding 30, there is no current flowing in secondary winding 32. Since the base of transistor 16 is connected to the emitter through resistor 33 and winding 32, there will be no conduction through the switch 16 in the absence of current in winding 32.

Putting it another way, transistors 21, 22 and 23 combine to make a three-way OR circuit which prevents switch 16 from turning on unless the three criteria established by peak current detector 18, flux decay circuit 19 and regulation circuit 20 are satisfied.

Peak current detector 18 operates to indirectly sense the current flowing in primary winding 3 by measuring the voltage induced in secondary winding 7.

Capacitor 36 gradually accumulates a positive charge through resistor 37 during the period current is flowing through primary winding 3. Rectifiers 9 and 38 are back biased because of the polarity of the voltage induced across winding 7. When the voltage at the input 41 of differential amplifier 42 rises to the level of the reference voltage at input 43, the voltage at output 44 rises to a positive value to turn on transistor 21 which then turns off transistors 25, 26 and finally switch 16.

The values of capacitor 36 and resistor 37 are selected to provide a charging curve which results in a voltage at input 41 at the precise time when the current in the primary winding 3 rises to the maximum desired value. This assures that the same quantity of energy will be stored in the core on each cycle of operation.

During the time that flux in the magnetic core of transformer 4 is decreasing, rectifiers 38 and 39 are foward biased, creating a discharge path for capacitor 36 through resistor 40. This assures that the voltage across capacitor 36 will be reduced to the value representing the forward voltage drop across rectifier 38.

The flux decay circuit 19 is designed to provide a signal indicating the point where the flux in the core of transformer 4 has decayed to zero. As long as there is flux decaying in the core, the voltage at terminal 50 remains positive. This positive voltage back biases diode 51 causing base current to be supplied to transistor 22 through resistor 52 and diode 53. The base current causes transistor 22 to saturate and hold transistors 25 and 26 in the non-conducting state, thus holding semiconductor switch 16 in the non-conducting and open condition.

Regulation circuit 20 is effective to sense the voltages applied to terminals 55, 56, 57 and 58. Positive voltage outputs, corresponding to the voltages derived from output terminal 10 are applied to terminals 55 and 56. The voltage at summing junction 59 controls the flow of current through transistor 60 having a load which includes resistor 66 and diode 67. Negative voltage outputs, corresponding to the voltages derived from output terminal 11 are applied to terminals 57 and 58. The voltage at summing junction 61 is applied to the base of amplifier transistor 62. The output voltage, developed across the load of resistor 63 and diode 64, is applied to the base of transistor invertor 65. Since transistor 65 shares the same load with transistor 60, the combined output voltages applied to the base of transistor 70 represent the sum of the positive and negative voltages to be regulated. The output signal from transistor 70, which is developed across load resistor 71, is applied to non-inverting input terminal 72 of differential amplifier 73. When this voltage rises to a point where it equals the value of the reference voltage at inverting input terminal 74, the voltage at output terminal 75 goes positive. The positive voltage at terminal 75 causes transistor 23 to go into conduction. Conduction through transistor 23 has the same effect as previously described with reference to conduction through transistors 21 and 22.

While this type of regulation has the effect of responding only to the sum of the individual output voltages, the overall performance is quite good when individual voltages are monitored. This is because those filter capacitors associated with the voltages which are below the desired value tend to absorb current caused by the decaying flux before those capacitors which are charged to the desired voltage. In other words, those capacitors having voltages which are below the others tend to receive current from the secondary windings before those capacitors charged to the desired voltage.

When all three of the conditions monitored by circuits 18, 19 and 20 are satisfied so that transistors 21, 22 and 23 are cut off, transistor 25 is biased into conduction. This causes transistor 26 to conduct current through primary winding 30 of driver transformer 31 and induce a current in secondary winding 32. The current flowing in winding 32 provides base current to bias the transistor switch 16 into conduction. The parameters of transformer 31 are selected so that the duration of the current flow in winding 32 is sufficiently long to ensure that transistor switch 16 will be biased into conduction for a period long enough to assure that the desired maximum amount of energy can be stored in the core of transformer 4. In actual operation of the circuit shown in FIG. 1, transistor 16 will be placed in the conductive state when the flux decay circuit 19 signals the flux in the core of transformer 4 has decayed to zero, and the regulation circuit 20 signals that the sum of the regulated voltages is less than the desired value. Transistor 16 then begins conduction and remains in the conductive state until turned off by a signal from the peak current detector 18 or the regulation circuit 20.

Since transistor 16 must handle appreciable amounts of current, the frequency response of the device is limited by the construction necessary to satisfy the current and voltage requirements of the application. Despite the fact that it would be desirable to have the switch pass from conduction to cutoff without operating in the active (linear) region, the switches used in this type of circuit do in fact have an appreciable period of conduction due to current fall-time. Because of the fact that the voltage across the switch is increased due to the collapse of the leakage flux, dissipation during the turn-off period becomes a critical factor.

The energy represented by the leakage flux is absorbed in the reactive clamp circuit which includes inductor 80, diode 81 and capacitor 82. This clamp circuit and certain other components of the circuit in FIG. 1 are also shown in the sequence of FIGS. *3a–3f*. The sequence is illustrative of the voltage polarity and current flow at various points in the cycle of operation of switch 16. Circuit components in FIGS. *3a–3f* are identified with the same reference character as used for the corresponding component in FIG. 1. The portrayal of semiconductor switch 16 is in the fashion of an arrow so that the state of the switch is apparent from the drawing.

Figures 3A, 3B, 3C, 3D, 3E, 3F:
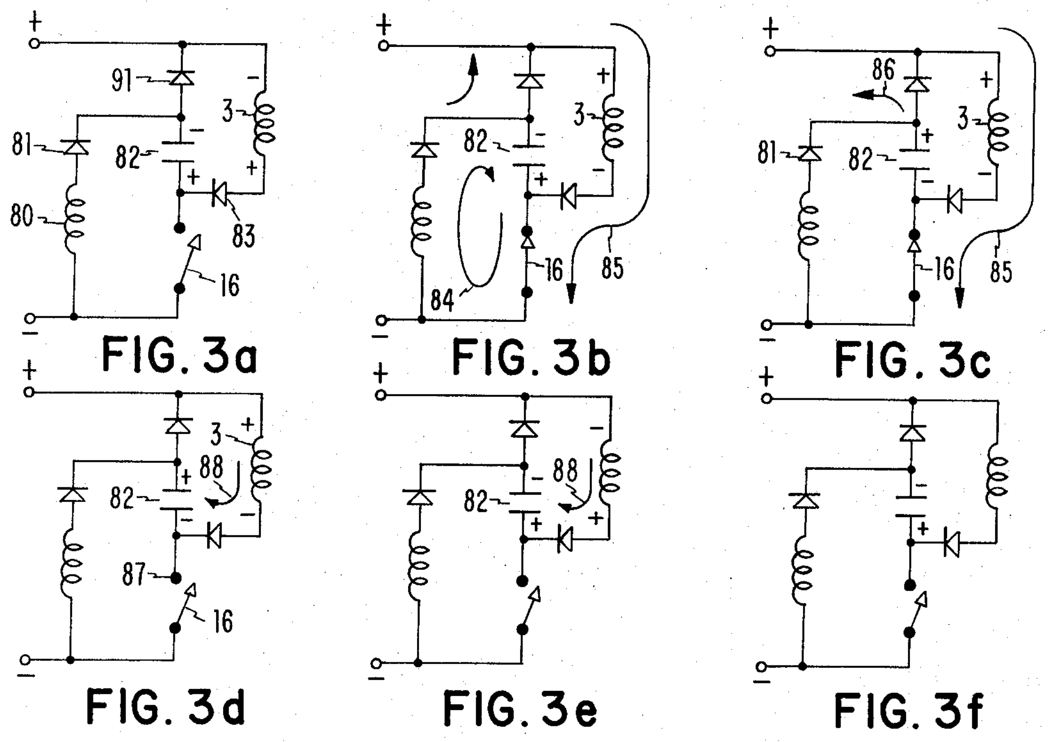

FIG. 3*a* illustrates the situation when switch 16 is open. No current will flow but the forward biased condition of diode 83 causes capacitor 82 to accumulate a charge as shown. When switch 16 is closed, as shown in FIG. 3*b*, the charge which existed on capacitor 82 causes current to flow in the direction indicated by arrow 84. At the same time, current flows from the source of energy through winding 3 and switch 16 in the direction of arrow 85.

The inductor 80 and capacitor 82 comprise a resonant circuit. When switch 16 closes, the voltage across capacitor 82 causes the circuit to begin oscillation. But for the effect of diode 81, the oscillations would continue in a gradulally decaying fashion. The time required for this decay would be a function of the Q of the resonant circuit. Diode 81 has the effect of terminating the oscillation after ½ cycle. Inductor 80 also serves to limit the current through switch 16 at closure to prevent burnout of the switch.

The waveform of the oscillation is shown in FIG. 5. The voltage and current at the start of the oscillation are shown at $T_0$. As soon as switch 16 is closed, the current in the resonant circuit ($I_{ResCir}$) begins to rise. Correspondingly, the voltage across capacitor 82 ($E_c$) begins to fall. Current reaches a maximum at the time when the voltage across capacitor 82 is a minimum. The current then begins to decrease and the voltage across capacitor 82 begins to increase but with a polarity opposite to that which existed at the outset. The peak value of voltage across capacitor 82 is reached at $T_{1/2}$, when the current has again dropped to zero. At this point diode 81 is back biased and no current can flow so the voltage on capacitor is prevented from discharging.

This state is represented by FIG. 3*c*. Current is still flowing through winding 3 as indicated by arrow 85. The voltage across capacitor 82 has been reversed in polarity and current flow in the direction of arrow 86 is blocked by the back biased diode 81. This condition persists until switch 16 is opened.

FIG. 3*d* illustrates the situation when switch 16 is opened. When switch 16 is opened, current begins to flow in capacitor 82. The actual voltage at terminal 87 cannot rise immediately because of capacitor 82. The current flow indicated by arrow 88 operates to charge capacitor 82. The voltage at terminal 87 follows the charging curve of capacitor 82. Since the voltage at terminal 87 rises relatively slowly, the switch 16 sees only a moderate increase in voltage during the turn off delay period.

Current flow according to arrow 88 continues as shown in FIG. 3*e* until the charging of the capacitor 82 by the induced voltage across winding 3 is complete.

The final state of the circuit is shown in FIG. 3*f.* Capacitor 82 has been charged as shown and the voltage across switch 16 is equal to the supply voltage.

The waveform of the voltage across switch 16 is shown in FIG. 4. This waveform corresponds to the voltage at the collector of transistor 16 in FIG. 1. With transistor 16 in the conductive state, the voltage at the collector is very low, in the order of a few volts or less. When transistor 16 starts to turn off, the voltage at the collector begins to rise. The slope of the curve at this time is defined by the relationship $$\Delta V/\Delta T = I/C$$

where I is the current into the capacitor which results from the voltage induced by the collapsing leakage flux, and C is the value of the capacitor 82. While C will have a value selected to limit the peak voltage to a desired value it will also serve to hold the rate of increase to a figure such that the voltage across the switch will not increase too much during the time the switch is turning off.

For a given value of leakage flux in transformer 4, the ultimate voltage to which capacitor 82 is charged will be inversely related to the capacity. The larger the capacity, the lower the voltage and conversely. The value of capacitor 82 is selected so that all the energy in the leakage flux can be stored without charging to a voltage which is greater than switch 16 can withstand when it is in the off condition.

In the waveform shown, the capacitor limits the rate of increase to a low value so that transistor 16 completes the turn off period before the voltage has risen to the value of the supply voltage. Even though the voltage continues to rise after turn off is complete, this will not damage transistor 16 since no current flows through the transistor and dissipation is therefore zero.

The voltage across capacitor 82 ultimately rises to a value $V_c$ and current in winding 3 drops to zero. At this point, with all energy in the core of transformer 4 being delivered to the secondary windings of transformer 4 and the voltage at the collector of transistor 16 is equal to the supply voltage plus the reflected voltage across winding 3.

At some point the current in secondary windings 6 and 7 drops to zero and the voltage at the collector of transistor 16 stabilizes at the value of the supply voltage where it remains until transistor 16 is again turned on.

This waveform assumes that the induced voltage across winding 3 due to energy contained in the leakage flux is at least as great as the supply voltage. If this is not the case there would be an abrupt increase in the voltage at the collector of transistor 16 as soon as turn off begins. The value of this increase would be equal to the difference between the supply voltage and the voltage $V_c$ to which the capacitor 82 was charged.

To avoid this eventuality, the circuit of FIG. 1 can be modified as shown in FIG. 2. A voltage supply means such as an additional winding 90 on the magnetic core of transformer 4 is connected in series with inductor 80. The voltage across this winding provides an offset voltage which assures that the capacitor will always charge to a value as great as the supply voltage.

FIG. 5 shows the voltage and current waveforms which exist in the series resonant circuit established when switch 16 is closed. The half-cycle of oscillation provides a capacitor voltage polarity reversal and the magnitude remains the same. If the half-cycle of oscillation is symmetrical about a voltage raised above ground, the waveforms follow FIG. 6. An offset bias voltage produced by winding 90 causes the circuit voltage to be biased in a fashion such as to be non-symmetrical with respect to ground. In the event that the oscillation voltage plus the offset voltage exceeds the supply voltage, diode 91 becomes forward biased to return the surplus energy to the source.

From the foregoing description, it is apparent that the capacitor 82 and the inductor 80 each perform multiple functions. The capacitor serves to limit the maximum voltage across the switch, it is an element of the polarity reversing resonant circuit and further serves to limit dissipation during the time the switch is turning off. The inductor serves as an element of the polarity reversing resonant circuit and provides a restraint on the initial surge of current from capacitor 82 when switch 16 is closed.

The actual values for the various components are dependent on parameters such as the voltage of the source of electrical energy, the output voltages to be generated, the total current to be delivered from the secondary windings of transformer 4 and the leakage induction of winding 3. Representative values for one embodiment are: capacitor 82 0.03 mfd, inductor 80 120 μh, primary winding 3 38 turns, secondary windings 90 5 turns. In this embodiment, the resonant frequency of the series resonant circuit was approximately 90 khz. Since the period for a ½ cycle oscillation was approximately 5 μ seconds, there was adequate time for the oscillation to complete even when switch 16 was closed for the shortest interval.

We claim:

1. In a static inverter having a magnetic core, a primary winding, a secondary winding and rectifier means connected to said secondary winding polarized to permit current to flow when the flux in the core is decreasing, means for connecting a source of electrical energy to said primary winding comprising:

a semiconductor switch device in series connection between a primary winding and a source of electrical energy.

capacitor means connected to the junction of said semiconductor switch and said primary winding.

inductance means connecting said capacitor means to the junction of said switch and said source of electrical energy, diode means in circuit with said inductance means and said capacitance means to block the reverse flow of current in said inductor-capacitor circuit after ½ cycle of oscillation whereby the polarity of voltage across said capacitor before the semiconductor switch is closed in reversal upon closure of said switch and, a voltage supply means connected to said inductance means for biasing the voltage about which oscillation takes place in a direction to increase the voltage retained by the capacitor after ½ cycle of oscillation.

2. A system according to claim 1 wherein said voltage supply means includes a winding about said magnetic core.

3. In a stored energy inverter system, a magnetic core having primary and secondary windings, a rectifier means connected to said secondary winding to deliver energy to a load when the magnetic flux in said core is decreasing, means for connecting said primary winding to a source of electrical energy comprising:

semiconductor switch means having a first output terminal connected to said primary winding and a second output terminal connected to said source of electrical energy, capacitor means, inductor means, rectifier means, voltage supply means, means connecting said capacitor means, inductor means, rectifier means and voltage supply means to form a series circuit between said first and second output terminals, said rectifier being polarized to permit one-half cycle of oscillation when the switch is closed to effect a reversal of the polarity of the charge on said capacitor and said voltage supply means being effective to bias the voltage about which said oscillation takes place in a direction to increase the voltage retained by said capacitor after one-half cycle of oscillation.

4. A system according to claim 3 wherein said voltage supply means includes a winding about said magnetic core.

5. A system according to claim 4 further including second rectifier means having one electrode connected to a point on said series circuit common to said first rectifier means and said capacitor, and a second electrode connected to said source of electrical energy, said second rectifier means being polarized to return energy to said source when the amplitude of said half-cycle oscillation is such that the voltage of said source of energy is exceeded.

6. A system according to claim 4 wherein said voltage supply means includes a winding common to said inductive load.

7. A system according to claim 6 further including second rectifier means having one electrode connected to a point on said series circuit common to said first rectifier means and said capacitor, and a second electrode connected to said source of electrical energy, said second rectifier means being polarized to return energy to said source when the amplitude of said half-cycle oscillation is such that the voltage of said source of energy is exceeded.

8. A clamp circuit for an inductive load comprising, switch means connecting said load to a source of energy, a series resonant circuit connected across said switch means, said resonant circuit including a capacitor, an inductor, a rectifier and a voltage supply means, said rectifier being in series circuit with said capacitor and said inductor whereby said resonant circuit completes ½ cycle of osciallltion upon closure of said switch to reverse the polarity of the voltage across said capacitor and said voltage supply means biases the voltage about which oscillation takes place in a direction to increase the voltage retained by said capacitor after ½ cycle of oscillation.

* * * * *

PO-1050
(5/69)

UNITED STATES PATENT OFFICE
CERTIFICATE OF CORRECTION

Patent No. 3,818,311 Dated June 18, 1974

Inventor(s) Gary L. Mattson and Lawrence P. Segar

It is certified that error appears in the above-identified patent and that said Letters Patent are hereby corrected as shown below:

IN THE CLAIMS:

Column 8, Line 24, Claim 6, "4" should be --8--.

Signed and sealed this 8th day of October 1974.

(SEAL)
Attest:

McCOY M. GIBSON JR.
Attesting Officer

C. MARSHALL DANN
Commissioner of Patents